United States Patent

Morse

[15] 3,647,310
[45] Mar. 7, 1972

[54] UNIVERSAL HOLE SAW ARBOR

[72] Inventor: Mansfield K. Morse, 1916 Frazer Avenue, N.W., Canton, Ohio 44709

[22] Filed: Apr. 3, 1970

[21] Appl. No.: 25,352

[52] U.S. Cl. ............................... 408/239, 279/1 A, 408/209
[51] Int. Cl. ........................................................ B23b 51/00
[58] Field of Search ................... 143/85, 85.1, 155 A, 155 D, 143/155 R; 408/186, 196, 239; 144/23, 20; 279/1 A

[56] References Cited

UNITED STATES PATENTS

| | | | |
|---|---|---|---|
| 3,559,513 | 2/1971 | Hougen | 143/85 X |
| 3,293,740 | 12/1966 | Enders | 143/85 A X |
| 2,015,339 | 9/1935 | Ellingham | 143/85 A X |
| 3,360,025 | 12/1967 | Gallo, Sr. | 143/85 A X |
| 3,267,975 | 8/1966 | Enders | 143/85 A |
| 3,023,015 | 2/1962 | Pankow | 279/1 A UX |
| 3,456,532 | 7/1969 | Hougen | 143/85 A X |

Primary Examiner—Andrew R. Juhasz
Assistant Examiner—James F. Coan
Attorney—Frease & Bishop

[57] ABSTRACT

A universal hole saw arbor construction for mounting all types and sizes of hole saws which also accommodates the pilot drill used with the hole saws. The arbor construction includes as components a stem, a body, and various clamping nuts. These components are used in various combinations to mount and drive several types each of direct-driven and pin-driven hole saw blades. The pilot drill is adjustable for predetermined settings of the drill with respect to the blade in accordance with the thickness of the workpiece being sawed.

10 Claims, 17 Drawing Figures

INVENTOR.
Mansfield K. Morse
BY
Frease & Bishop
ATTORNEYS

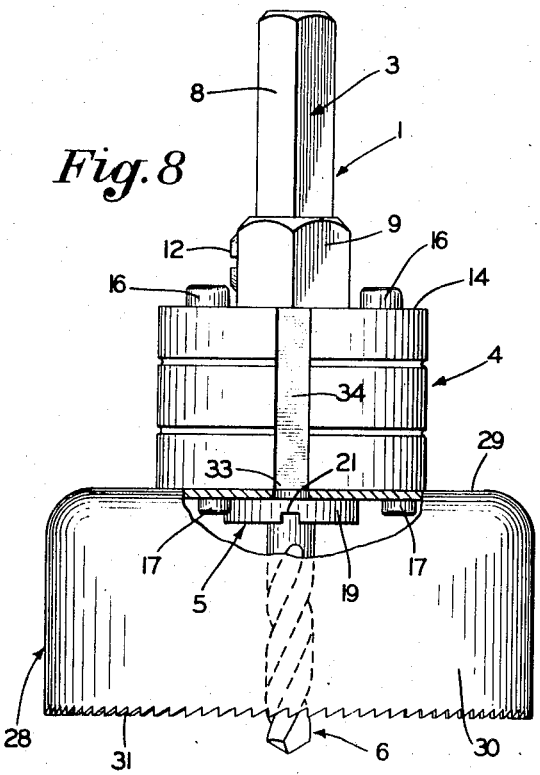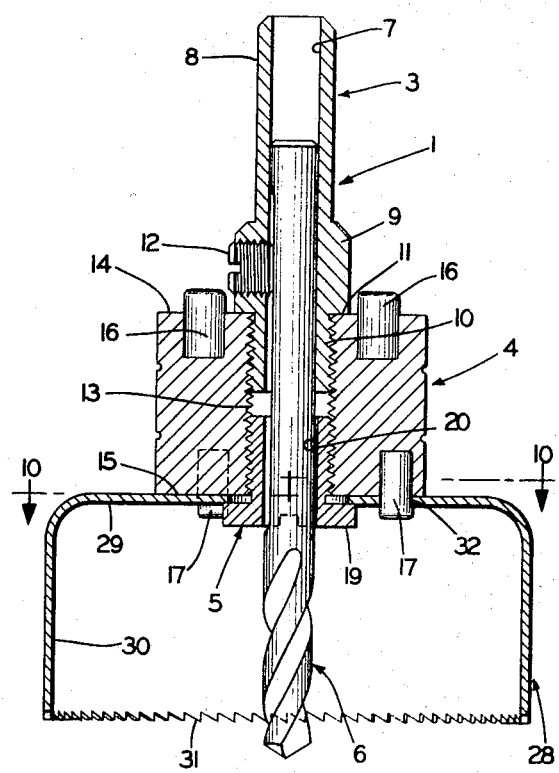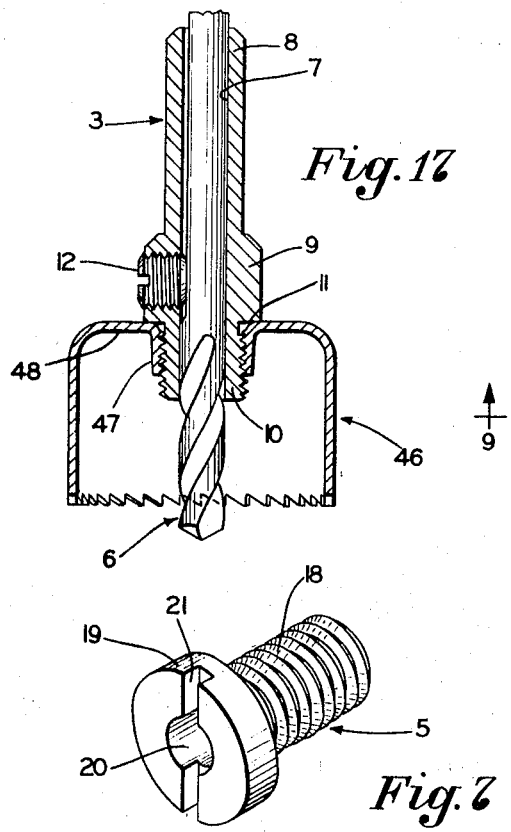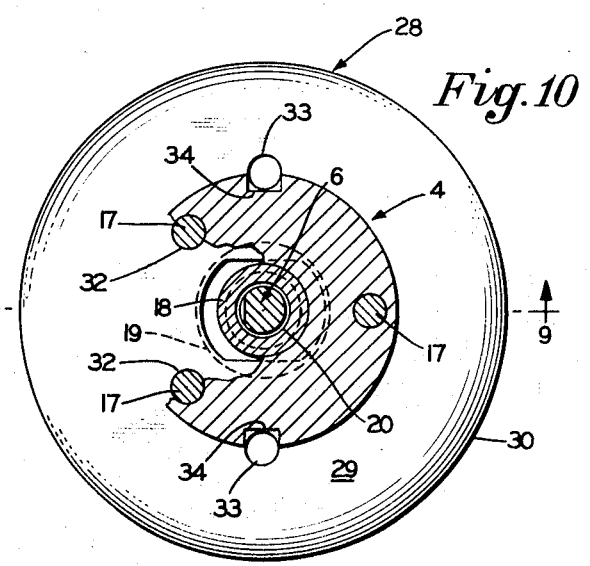

3,647,310

INVENTOR.
Mansfield K. Morse
BY
Frease & Bishop
ATTORNEYS 3,647,310

UNIVERSAL HOLE SAW ARBOR

1. Field of the Invention

BACKGROUND OF THE INVENTION

The invention relates to hole saws and to an arbor construction used for mounting hole saws on chuck drives of mechanisms for performing high-speed power-driven circular hole sawing operations. More particularly the invention relates to a universal arbor construction on which any of the various standard types of hole saws may be mounted; and relates to a universal arbor construction which has a minimum of components with which all known hole saw types may be mounted on a saw drive mechanism.

2. Description of the Prior Art

A number of different types of high-speed steel hole saw blades are on the market. These different types of blades presently require a number of different types of arbors for mounting the saw blades on the saw-driving mechanism. The saw blade types include direct driven blades having either screw-threaded connection or squared-key connection with the arbor. The blade types also include pin-driven blades having either a two-pin or a three-pin driving connection with the arbor.

These different saw blade types are manufactured by many different saw blade producers. Usually each type of saw blade has required a particular or special arbor construction for mounting the saw blade on driving mechanism for the saw. Some interchangeability between various saw blade types and special mounting arbors has existed, but there has been no known single arbor construction which could be used to mount all of the various known types of hole saw blades.

Pilot drills normally are used with hole saws. The pilot drill during sawing should not extend beyond the saw teeth a distance greater than the thickness of the workpiece. Prior arbors for the various hole saw types do not provide an easy means for pilot drill adjustment to accommodate different workpiece thicknesses. Frequently it has been necessary to grind the pilot drill to a shorter length for use in sawing a thin workpiece. As a result, hole saw users have had to purchase and maintain a stock of a number of different types of arbors and adapter parts in order to use the many different types of hole saws on the market. Also, users have had high pilot drill costs.

These conditions result, among other difficulties, in high costs for performing hole sawing operations from many standpoints, such as investment in various types of arbors, time and expense of changeover from one arbor to another when changing hole saws at the drive mechanisms, and cost and time and drill loss when grinding drills to accommodate thin work pieces.

These existing problems are solved and the difficulties encountered are eliminated by the universal hole saw arbor construction of the invention which includes components on which all hole saws known in the art may be mounted and which provides for pilot drill adjustability.

SUMMARY OF THE INVENTION

Objectives of the invention include providing a universal hole saw arbor construction with which a complete range of hole saw blade sizes of all known types may be mounted for connection to the chuck of saw drive mechanism; providing means for adjustably mounting the pilot drill for the hole saw to enable the pilot drill tip to be located a predetermined distance axially with respect to the saw blade teeth; providing a minimum of arbor components each having a simple construction easily combined in various combinations for mounting the various hole saw types; and providing a construction which is inexpensive to manufacture, sturdy and durable in use, and which eliminates difficulties heretofore encountered, achieves the objectives indicated, and solves problems and satisfies needs existing in the art.

These objects and advantages are obtained by the universal hole saw arbor construction, the general nature of which may be stated as including as components, a stem, a body, and various clamping nut means; the arbor stem being generally tubular with an axial bore, one end of the stem being externally threaded, a central portion of the stem being formed with a flange providing a shoulder adjacent the external threads, and the other or shank end of the stem preferably being formed to have a hexagonal external shape in cross section for driving engagement with the chuck of a rotatable spindle of saw drive mechanism; the arbor body having a central threaded bore and flat faces perpendicular to the bore at the ends of the bore, two diametrically opposed pins projecting from one flat body face, and three triangularly located pins projecting from the other flat body face; the body being adapted to be threaded onto the stem external threads with either flat face engaged against said shoulder; one of the clamping nut means comprising an externally threaded tubular stud with a flanged head at one end of the stud, and the stud being adapted for threaded engagement with the body threaded bore at the end of the body bore opposite that into which the stem is threaded, and with a wall of a hole saw clamped between the stud head and a body face and with hole saw holes engaged over the pins projecting from such body face; said body being reversibly assembled to the stem and clamping nut means, whereby a saw blade with either two or three drive holes may be engaged respectively with the two or three pins projecting from the flat body faces; the threaded stem end also being adapted to be threaded into a central threaded boss of a threaded-boss hole saw blade with a wall of such saw blade seated against the arbor stem shoulder; another of the clamping nut means having a squared-key drive projection surrounding a central threaded nut opening, and the squared-key projection being adapted to be seated in a complementary squared-key opening formed centrally in a hole saw blade wall, with said wall clamped between the squared-key nut and said stem shoulder when the squared-key nut is threaded onto the threaded stem end; said stem bore being adapted to telescopically receive the shank of a pilot drill; and preferably setscrew means mounted on the stem flange for clamping a pilot drill in predetermined adjusted axial position within said bore.

BRIEF DESCRIPTION OF THE DRAWINGS

A preferred embodiment of the invention—illustrative of the best mode in which applicant has contemplated applying the principles—is set forth in the following description and shown in the drawings, and is particularly and distinctly pointed out and set forth in the appended claims.

FIG. 7 is a perspective view of a hollow clamping bolt;

FIG. 8 is a side view of the arbor of FIG. 1 with a three-pin-driven blade mounted thereon;

FIG. 9 is a section of the arbor and blade of FIG. 8, taken on the line 9—9, FIG. 10;

FIG. 10 is a sectional view, with parts broken away, taken on line 10—10, FIG. 9;

FIG. 17 is a view similar to FIG. 12 showing another type of direct-driven blade mounted on the arbor stem component.

Similar numerals refer to similar parts throughout the drawings.

DESCRIPTION OF THE PREFERRED EMBODIMENT

Figure 1:
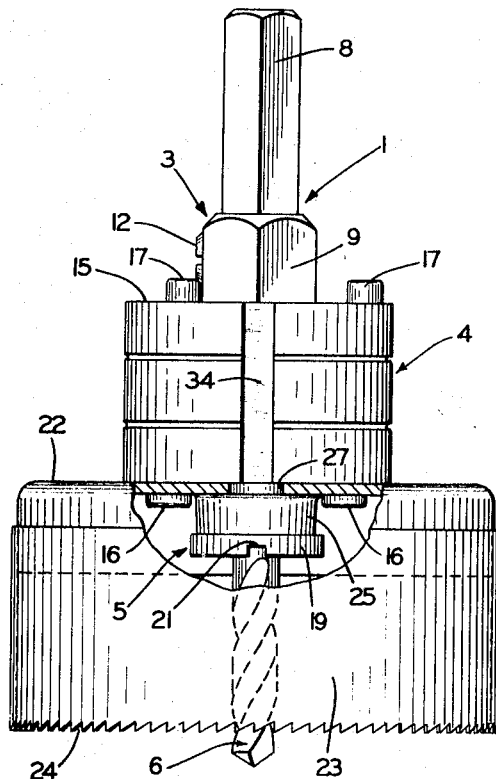
FIG. 1 of the drawings is a side view of the improved arbor with a two-pin-driven blade mounted thereon, certain parts being broken away and in section.

The improved universal hole saw arbor structure is indicated at 1 in FIG. 1 with a two-pin-driven hole saw blade 2 mounted thereon. Arbor 1 has a stem 3 assembled with a pin drive body 4, and a clamping nut 5 clamps hole saw blade 2 to body 4. A pilot drill 6 also is assembled with stem 3.

Stem 3 is generally tubular and has an axial bore 7 and a top shank portion 8 generally hexagonal in cross section. Shank 8 is adapted to be drivingly engaged by a chuck (not shown) of power drive mechanism for the saw. Stem 3 is formed with a central flange 9 and a lower externally threaded portion 10, flange 9 forming shoulder 11 at the upper end of threaded portion 10.

Figure 4:
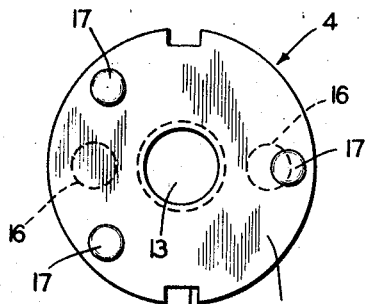
FIG. 4 is a top plan view of the pin drive body shown in FIG. 3.
Figure 3:
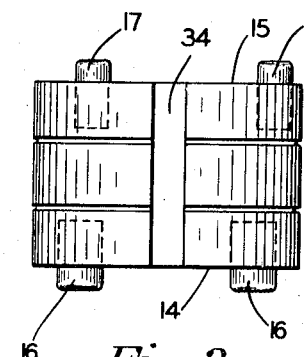
FIG. 3 is a side view of the pin drive body.
Figure 5:
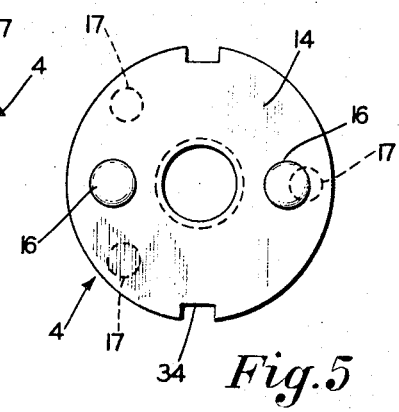
FIG. 5 is a bottom plan view of the pin drive body shown in FIGS. 3 and 4.

Stem flange 9 also preferably has an external hexagonal shape in cross section (FIG. 1) so that the flange may be engaged by a wrench for arbor assembly. Pilot drill 6 is received within axial stem bore 7 and may be clamped in any axially adjusted position by setscrew 12 extending through central flange 9. Body 4 has a central threaded bore 13 and flat end faces 14 and 15 perpendicular to bore 13 at the ends of the bore. Two diametrically opposed pins 16 project from body face 14 (FIG. 5), and three triangularly located pins 17 (FIG. 4) project from the other body face 15. Pins 16 have a larger diameter than pins 17, as shown.

Pin drive body 4 may be assembled with arbor stem 3 by threading threaded stem portion 10 into threaded body bore 13 at either end of bore 13 so that stem shoulder 11 engages securely against either body face 15 (FIG. 2) or 14 (FIG. 9).

Clamping nut 5 (FIG. 7) is essentially a tubular stud with an externally threaded shank 18 and a flanged head 19 with a central bore 20 extending through the head and shank. Stud head 19 preferably is formed with a tool engageable slot 21 which may be engaged by a wrench or screwdriver for arbor assembly to thread the nut 5 into the body bore 13 at either end of the body. Clamping nut bore 20 preferably has the same size as the stem bore 7 so as to accommodate a pilot drill 6 when assembled with the improved arbor structure, as shown in FIGS. 2 and 9.

Hole saw 2 is typical of one standard type of two-pin-driven hole saw. Hole saw 2 has a disc portion 22 and a circular blade portion 23 terminating in saw teeth 24. The saw disc also has a central internally threaded sleeve 25. A pair of diametrically opposed pin drive holes 26 is formed in saw disc portion 22 and a pair of knockout holes 27 also is formed in saw disc 22 (FIG. 6).

Figure 2:
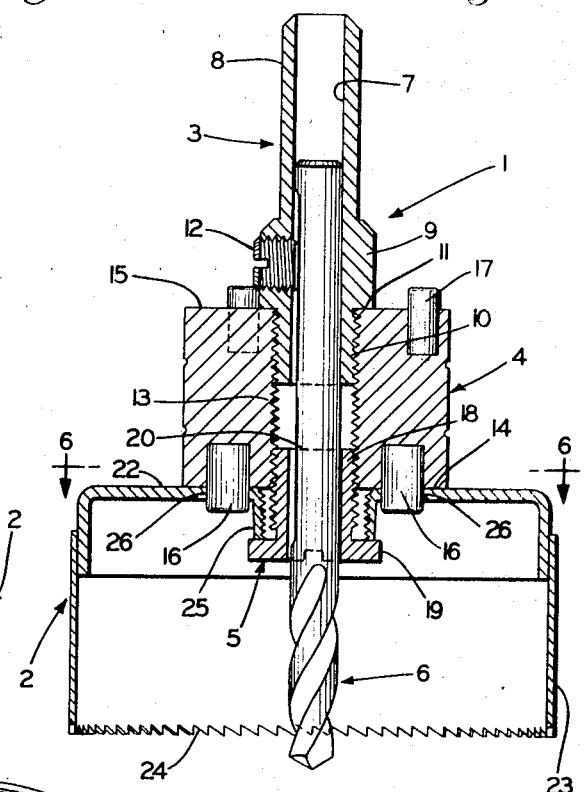
FIG. 2 is a section of the arbor and blade of FIG. 1 taken on the line 2—2, FIG. 6.
Figure 6:
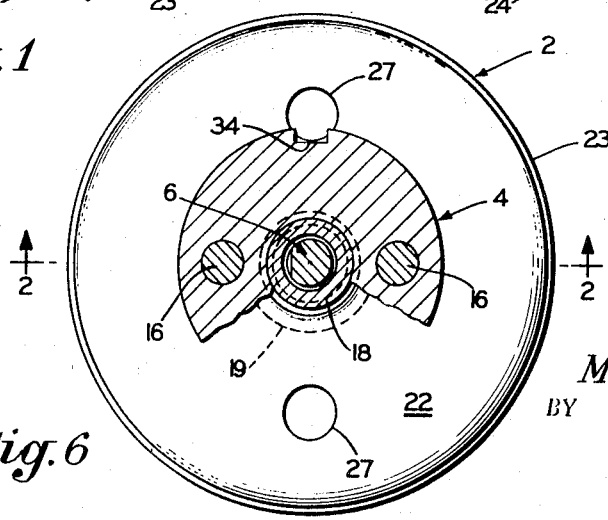
FIG. 6 is a sectional view, with parts broken away, taken on line 6—6, FIG. 2.
Figure 11:
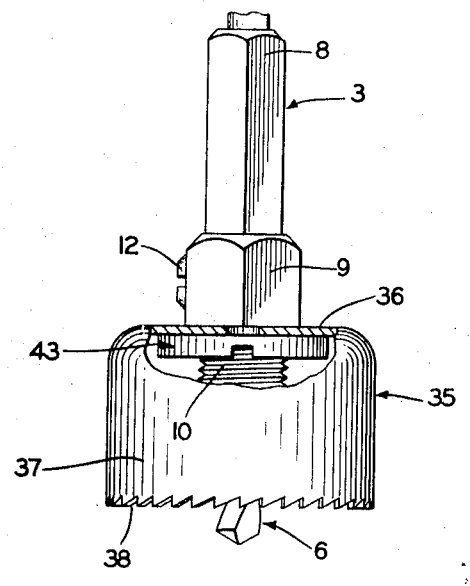
FIG. 11 is a side view of a portion of the arbor of FIGS. 1 and 8 with a direct-driven blade mounted thereon.
Figure 12:
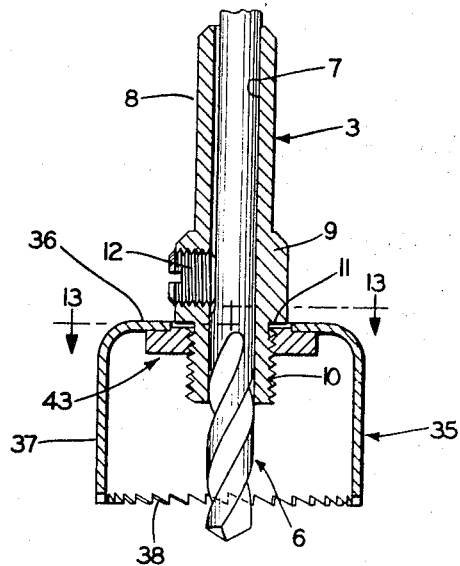
FIG. 12 is a section of the arbor portion and blade of FIG. 11.
Figure 14:
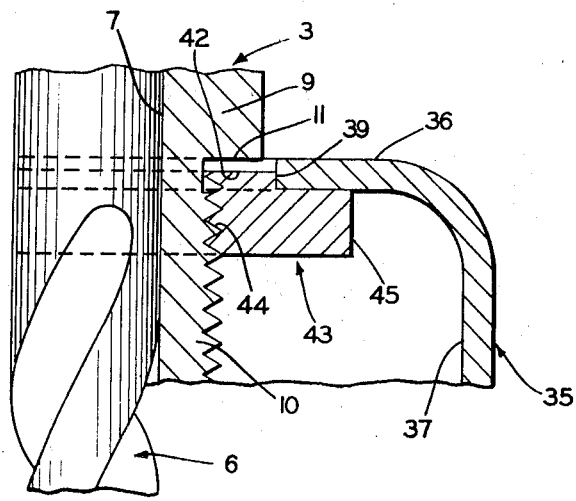
FIG. 14 is an enlarged fragmentary sectional view of a portion of FIG. 12.
Figure 13:
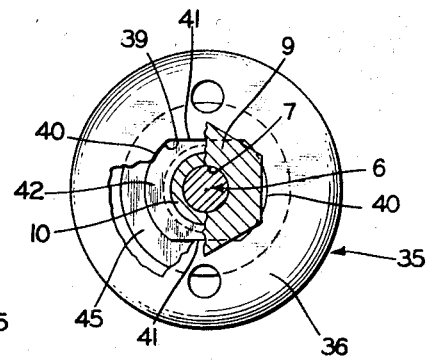
FIG. 13 is a sectional view, with parts broken away, taken on line 13—13, FIG. 12.
Figures 15, 16:
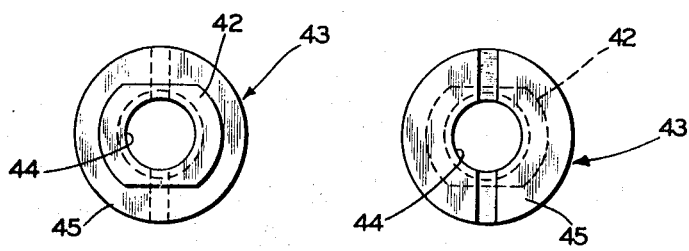
FIG. 15 is a top plan view of the adapter nut shown in FIGS. 11–14.
FIG. 16 is the bottom plan view of the adapter nut shown in FIG. 15.

The improved universal arbor construction may be used to mount the two-pin hole saw blade 2 as shown in FIGS. 1 through 6. Stem 3 is assembled with drive body 4 with stem shoulder 11 engaged with body face 15 so that the pair of two drive pins 16 project downward from the lower end of the assembled stem and body 3-4. The drive pin holes 26 of saw blade 2 then are telescoped over the pair of drive pins 16 which have the same diameter as the drive holes 26 (FIG. 2). Clamping nut 5 then is threaded into the lower end of body bore 13 until the stud head 19 engages the end of saw sleeve 25, thus tightly clamping saw disc 22 against the body face 14, as shown in FIGS. 1, 2, and 6.

A typical three-pin hole saw blade is indicated at 28 in FIGS. 8 and 9. Blade 28 has a disc portion 29 and a blade portion 30 terminating in saw teeth 31. Three triangularly arranged drive-pin-receiving holes 32 are formed in disc portion 29 having the same diameter as body pins 17 and are triangularly arranged and located in the same manner.

Three-drive-pin saw blade 28 may be mounted on the improved arbor construction by assembling stem 3 and body 4 (FIG. 9) with the three drive pins 17 projecting from the lower end of the assembled stem and body 3-4. Blade pin holes 32 are then engaged over drive pins 17 with saw disc 29 engaged against body face 15 (FIG. 9). Clamping nut 5 is then threaded into the lower end of the body bore 13 until stud head 19 engages saw disc portion 29 clamping it against body face 15.

Thus, the new arbor structure by reversibly assembling body 4 with stem 3 may be used to mount either of the two standard types of pin-drive hole saws as described.

The pair of drive pins 16 is located closer together (FIG. 6) than the set of three pins 17 (FIG. 10). Also, pins 16 are larger in diameter than pins 17. Also, pins 17 are not spaced 120° apart. Thus, there is only one way in which saw blade 28 may be assembled with the three drive pins 17.

These differences in the structure of the two-pin saw blade 2 and the three-pin saw blade 28 prevent interchangeability in use with arbors that have been available, and which have required special arbors to be stocked and used for mounting each of the two different saw blades 2 and 28.

Saw blade 28 also is provided with knockout holes 33. These holes and knockout holes 27 in saw blade 2 are used to insert a tool through the saw discs to knock out a metal slug which may be retained or lodged within the saw blade at the end of a sawing operation, which slug has been sawed out of the workpiece.

Knockout holes 27 in saw blade 2, as they exist in the standard saw blade of this type, are quite close to the axis of the arbor. Accordingly, arbor body 4 is provided with cutouts 34 to assure access to knockouts 27.

Cutouts 34 in FIG. 10, also are aligned with and permit access to knockout holes 33 in the saw blade 28 at their location in standard three-pin hole saw blades.

There are also several standard types of direct-driven saw blades, and these frequently are used for smaller diameter saws. One direct-driven type of saw blade is shown in FIGS. 11 to 14 and indicated at 35. Blade 35 has a disc portion 36, and a blade portion 37 terminating in saw teeth 38. A squared-key opening 39 is formed centrally in disc portion 36 having rounded ends 40 and parallel straight sides 41 which functions in the same manner as a squared drive connection. This standard type of saw blade 35 may be assembled with the arbor stem 3 by telescoping squared-key opening 39 over a complementary squared-key projection 42 on a nut 43 having a central threaded opening 44 and a nut head 45. Assembled nut 43 and saw blade 35 then are threaded onto the threaded portion 10 of stem 3 (FIGS. 11 and 12) until the saw disc portion 36 is engaged and clamped against stem shoulder 11. A pilot drill 6 may be assembled in stem 3, as shown.

Another standard type of direct-driven saw blade is shown in FIG. 17 and indicated at 46. Saw blade 46 differs from saw blade 35 in that the squared-key opening is omitted, and instead blade 46 has a central internally threaded sleeve 47, like the sleeve 25 of blade 2. Blade sleeve 47 may be threaded onto threaded stem portion 10 until the saw disc portion 48 engages stem shoulder 11. Thus, portions of the new arbor structure, namely, the stem and an alternate form of clamping nut, may be used to mount two different forms of direct-driven hole saw blades.

In using a hole saw, it is important that the pilot drill should not completely penetrate the workpiece. Thus, the pilot drill must be adjusted so that its tip location may be fixed at a predetermined distance from the saw teeth less than the thickness of the workpiece being sawed. The new arbor construction permits this adjustment to be made merely by loosening setscrew 12 and adjusting pilot drill 6 to the proper location with respect to the teeth of the particular saw blade mounted on the arbor.

Accordingly, the new arbor construction provides a universal arbor having components which may be used to mount all types and sizes of hole saws, either pin-driven or direct-driven, and at the same time permits adjustment of the pilot drill with respect to whatever type of saw is mounted on the arbor in accordance with the thickness requirements of the workpiece; provides an arbor which may readily be mounted on the chuck drive of high-speed saw drive mechanism; provides a new arbor which substantially reduces the cost of performing hole sawing operations; provides a new arbor construction which is simple, effective, and safe in use, which may be quickly assembled for any type of hole saw, which avoids difficulties encountered with prior devices, and which achieves the objectives and solves problems existing in the art.

In the foregoing description certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved universal hole saw arbor is constructed and used, the characteristics of the new construction, and the advantageous, new and useful results obtained; the new and useful structures, devices, elements, arrangements, parts, and combinations, are set forth in the appended claims.

I claim:

1. Universal hole saw arbor construction including stem, body and clamping nut means components; the arbor stem having a shouldered threaded end and a shank end; the arbor body having a central threaded bore and flat end faces perpendicular to the bore, a plurality of drive pins projecting from one end face, a plurality of differently located drive pins projecting from the other end face; one end of the body being threadably engaged and seated on the shouldered threaded stem end; and nut means removably clamping a hole saw to the other end of the body with hole saw pin drive openings engaged over the pins projecting from said other end of the body.

2. The construction defined in claim 1 in which the stem and nut means are provided with central axial bores that are aligned when the stem and nut means are assembled with the arbor body, and in which means is provided for axially adjustably mounting a pilot drill in said stem and nut means bores.

3. The construction defined in claim 1 in which a pair of diametrically opposed drive pins projects from the one body end face, in which a plurality of triangularly arranged drive pins project from the other body end face, and in which the triangularly arranged pins have diameters different from the diameters of the pair of pins.

4. The construction defined in claim 1 in which two drive pins project from one body end face, in which three drive pins project from the other body end face, in which the two drive pins have a predetermined size and location corresponding to the pin drive holes formed in a standard two-pin-drive hole saw, and in which the three drive pins have a predetermined size and location corresponding to the pin drive holes formed in a standard three-pin-drive hole saw.

5. The construction defined in claim 1 in which the arbor stem is tubular and formed with an axial bore, in which one end of the stem is externally threaded, in which the other shank end of the stem is formed with external chuck drive engaging formations, and in which a central portion of the stem is formed with a flange providing a shoulder adjacent the threaded stem end against which the body is seated when threaded onto the threaded stem end.

6. The construction defined in claim 5 in which the stem flange is provided with setscrew means for adjustably mounting a pilot drill in the stem bore.

7. The construction defined in claim 1 in which the nut means comprises an externally threaded tubular stud with a flanged head at one end of the stud, and in which the stud is adapted for threaded engagement with the bore of the body at the body end opposite that end which is threadably engaged with the stem, and with a hole saw clamped between the flanged stud head and the body end face at said opposite body end.

8. Universal hole saw arbor construction including a tubular stem having a top shank portion, a lower threaded portion, and an intervening flange; means for axially adjustably mounting a pilot drill within the stem; a reversible body having end faces provided with differently arranged projecting pin drive means; means for mounting either end of the body on the threaded stem portion seated against said flange; and means for clamping a hole saw blade against the other body end with its pin drive openings engaged over the adjacent body pin drive means.

9. Universal hole saw arbor construction including stem, body and clamping nut means components; the arbor stem being generally tubular with an axial bore, one end of the stem being externally threaded, a central portion of the stem being formed with a flange providing a shoulder adjacent the external threads, and the other end of the stem comprising a shank having chuck drive engagement formations; the arbor body having a central threaded bore and flat end faces perpendicular to the bore, two diametrically opposed pins projecting from one end face, and three triangularly located pins projecting from the other end face, and the body being adapted to be threaded onto the stem external threads with either flat face engaged against said shoulder; one of the clamping nut means comprising an externally threaded tubular stud with a flanged head at one end of the stud, and the stud being adapted for threaded engagement with the body threaded bore at the end of the body bore opposite that into which the stem is threaded, and with a wall of a hole saw clamped between the stud head and a body face and with hole saw holes engaged over the pins projecting from such body face; said body being reversibly assembled to the stem and clamping nut means, whereby a saw blade with either two or three drive holes may be engaged respectively with the two or three pins projecting from the body end faces; the threaded stem end also being adapted selectively to be threaded into a central threaded boss of a threaded-boss hole saw blade with a wall of such saw blade seated against the arbor stem shoulder; another of the clamping nut means comprising a disc having a squared-key drive projection surrounding a central threaded nut opening, and the squared-key projection being adapted to be seated in a complementary squared-key opening formed centrally in a hole saw blade wall, with said wall clamped between the squared-key nut and said stem shoulder when the squared-key nut is threaded onto threaded stem end; said stem bore being adapted to telescopically receive the shank of a pilot drill; and setscrew means mounted on the stem flange for clamping a pilot drill in predetermined adjusted axial position within said bore.

10. Universal hole saw arbor construction including a tubular stem having a top shank portion, a lower threaded portion, and an intervening flange forming a shoulder adjacent the threaded portion; means for axially adjustably mounting a pilot drill within the stem; hole saw mounting means including a reversible body having end faces provided with differently arranged projecting pin drive means, either end of said body is threadably engaged with the threaded stem portion and seated against said shoulder; and a nut is threadably engaged with the other end of the body for clamping a hole saw blade against said other body end with its pin drive openings engaged over the adjacent body pin drive means.

* * * * *